United States Patent [19]
Mito

[11] 3,772,978
[45] Nov. 20, 1973

[54] OPERATION DEVICE FOR OBJECTIVE LENS OF CAMERA

[76] Inventor: Hiroshi Mito, Omiya, Japan

[22] Filed: Oct. 30, 1972

[21] Appl. No.: 301,843

[52] U.S. Cl.................... 95/45, 350/187, 352/140
[51] Int. Cl.............................................. G03b 3/00
[58] Field of Search................... 95/45; 350/187; 352/140

[56] References Cited
UNITED STATES PATENTS

| | | | |
|---|---|---|---|
| 2,994,258 | 8/1961 | Schafer et al. | 95/45 |
| 3,074,334 | 1/1963 | Schafer | 95/45 |
| 3,122,079 | 2/1964 | Mahn | 95/45 |
| 3,465,662 | 9/1969 | Kashiwase | 95/45 |

*Primary Examiner*—Samuel S. Matthews
*Assistant Examiner*—Richard A. Wintercorn
*Attorney*—Watson, Cole, Grindle & Watson

[57] ABSTRACT

A device wherein the focusing adjustment in an objective lens of a camera, the adjustment for a diaphragm aperture, or the adjustment for zooming is effected by means of a single operation ring.

An operation ring capable of making an axial displacement along the optical axis and rotatable relative to the lens barrel of an objective lens is provided with a first annular strip for transmitting frictionally the rotation thereof at the front edge thereof and a second annular strip at the rear edge thereof, and selectively makes frictional engagement, corresponding to the axial displacement along the optical axis of the operation ring, of either a focusing ring or a zooming ring and an aperture adjusting ring, both to be engaged with the operation ring being axially spaced before and behind each other along the optical axis of the objective lens barrel, so as to be able to selectively adjust them by transmitting the rotation thereof.

5 Claims, 2 Drawing Figures

PATENTED NOV 20 1973　3,772,978
FIG. 1
FIG. 2
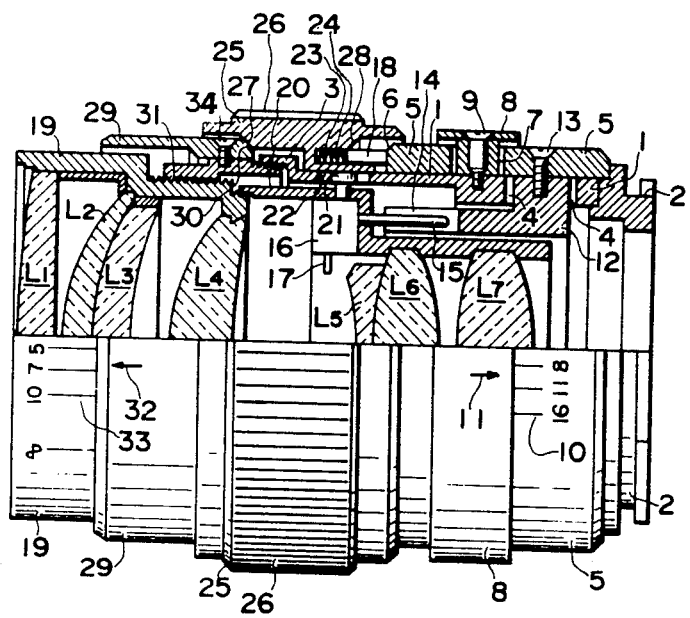
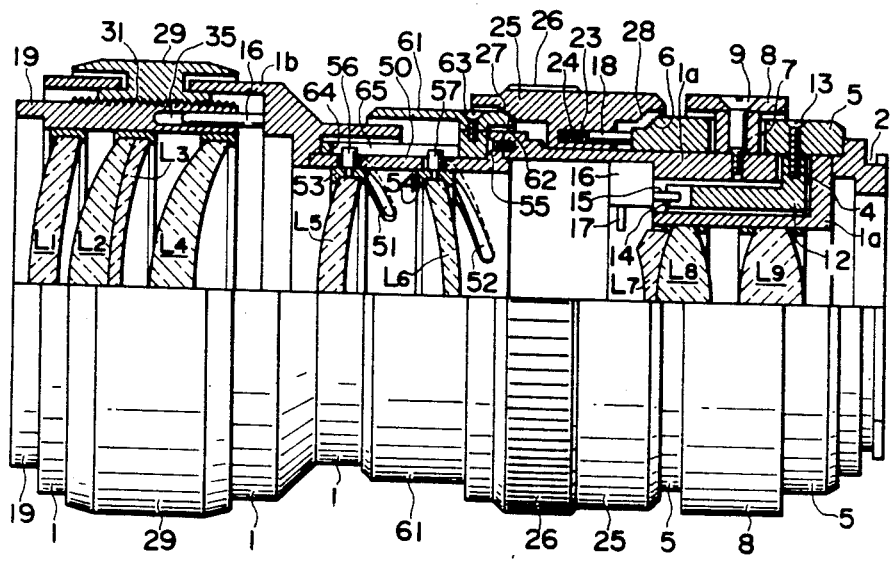

3,772,978

OPERATION DEVICE FOR OBJECTIVE LENS OF CAMERA

BACKGROUND OF THE INVENTION

Field of the invention

The present invention relates to an operation device provided with a single operation member capable of effecting a plurality of adjustments of the objective lens of a camera.

In the objective lens of a camera, at least, the adjustment for focusing and the adjustment for a diaphragm aperture are required, and in addition, in case the objective lens can be a zooming lens capable of zooming, an adjustment for zooming is also required.

In order to effect the adjustments mentioned above, the respective operation rings rotatable about the lens barrel have been provided. However, the disposition of a plurality of operation rings around the lens barrel in contact with each other causes the drawback that there may occur a mistake in selecting the right operation ring to be operated. Specially in the case of the adjustment for focusing, for a diaphragm aperture, or for zooming is effected while looking into the view finder, such a misoperation as mentioned above occurs easily, and it is quite troublesome to take eyes off the view finder to confirm whether the operation ring is correctly selected or not. Furthermore, in the operation with gloves on even after aforesaid confirmation, the operation of one selected operation ring is in great danger of moving the other operation ring together with the former.

In order to remove aforesaid drawback, in the present invention, a single operation member is adopted so that a plurality of adjustments of the objective lens can be effected by the rotating operation thereof at the respective different positions along the optical axis of the lens barrel.

THE OBJECT OF THE INVENTION

One object of the present invention is to provide an operation device for the objective lens of a camera wherein the two different adjustments of an objective lens are separately effected by the rotating operation of a single operation member at the respective different positions along the optical axis of a lens barrel.

Another object of the present invention is to provide an operation device for the objective lens of a camera wherein the adjustments for both focusing and a diaphragm aperture of the objective lens are separately effected by rotating operation of a single operation member at the respective different positions along the optical axis of a lens barrel.

Further object of the present invention is to provide an operation device for the objective lens of a camera wherein the adjustments for focusing the objective lens and for a preset ring for setting a diaphragm in advance can separately be effected by the rotating operation of a single operation member at the respective different positions along the optical axis of a lens barrel.

Still further object of the present invention is to provide an operation device for the objective lens of a camera wherein the adjustments for zooming of a zooming type objective lens and for a diaphragm aperture can separately be effected by the rotating operation of a single operation member at the respective different positions along the optical axis of a lens barrel.

Still further another object of the present invention is to provide an operation device for the objective lens of a camera wherein a single operation member axially movable along the optical axis of a lens barrel and provided with annular strips on the side edges thereof in the axial direction, is frictionally connected with adjusting members which effect two different adjustments of the objective lens in accordance with the position thereof in the axial direction on the lens barrel so as to enable the rotation of the operation ring to be selectively transmitted to the adjusting members.

SUMMARY OF THE INVENTION

In order to attain the objects mentioned above, the present invention relates to an operation device for the objective lens of a camera wherein an operation member rotatable as well as movable between adjusting members for separately adjusting two respective objective lenses axially spaced each other along the optical axis of the lens barrel for the objective lens of a camera, and on both edges along the optical axis of the operation member there are respectively provided a first and a second annular strips, one of which is selectively and frictionally connected with one adjusting member by axially positioning the operation member along the optical axis so as to transmit the rotation of the operation member to the adjusting member.

BRIEF DESCRIPTION OF THE DRAWINGS

FIG. 1 is a side view half cut away along the optical axis showing the vertical section of one embodiment in accordance with the present invention.

FIG. 2 is a side view half cut away along the optical axis showing the vertical section of another embodiment in accordance with the present invention.

DESCRIPTION OF THE PREFERRED EMBODIMENT

FIGS. 1 and 2 show embodiments wherein the adjustments for focusing the objective lens of a camera and for the diaphragm aperture are made possible by means of a single operation member.

In FIG. 1, reference numeral 1 denotes a fixing ring, to the rear end of which fitting portion 2 for mounting on a camera is fixed, and on the inner surface of other end of which screw 3 is formed.

Aperture adjusting ring 5 rotatably and loosely fited to the aforesaid fixing ring 1 has operation face 6 with a large frictional coefficient on the front edge thereof and annular slot 7 formed thereon. Into this slot 7 aperture setting ring 8 fixed into fixing ring 1 by screw 9 is fixed, and the aperture value set by diaphragm scale 10 on aperture adjusting ring 5 and index 11 on aperture setting ring 8 is indicated thereon. L-shaped aperture actuating lever 12 is fixed onto aperture adjusting ring 5 by screw 13 and extended forwards through annular slot 4 on fixing ring 1, and on the front end thereof slit 14 is formed in parallel with the optical axis.

Into aforesaid slit 14, pin 15 projecting backwards from an aperture ring (not shown in the drawings) in diaphragm device 16 fixed in lens retaining cylinder 20 for the back group of lenses consisting of lenses $L_5$, $L_6$ and $L_7$ at the position of the pupil between lenses $L_4$ and $L_5$ belonging to the objective lens consisting of lenses from $L_1$ to $L_7$, is engaged. Reference numeral 17 indicates a diaphragm blade whose aperture is adjusted by diaphragm device 16.

In front of aforesaid aperture adjusting ring 5, operation ring 25 rotatable as well as axially movable along the optical axis on fixing ring 1 is loosely mounted. Over the outer surface of operation ring 25 there is formed grip 26 so as to facilitate the manual operation thereof, and on the inner surface thereof there are formed first annular strip 27 and second annular strip 28, which are biassed so as to be displaced forwards by means of spring 24 in guide slot 23 formed on the rear edge thereof in parallel with the optical axis and pin 18 projectingly mounted on the front edge of aforesaid aperture operation ring 5.

First annular strip 27 is in contact with operation surface 27 formed on the rear edge of focusing ring 29 described later, and both are frictionally connected. When aforesaid operation ring 25 is displaced backwards against spring 24, aforesaid second annular strip 28 comes into contact with operation surface 6 of aforesaid aperture adjusting ring 5 to be frictionally connected, and, therefore, the rotation of operation ring 25 is transmitted to aperture adjusting ring 5.

Helicoid ring 31 spirally fitted into screw portion 3 for aforesaid fixing ring 1 is fixed with focusing ring 29 by means of screw 34 and into the screw formed in the inner surface of aforesaid helicoid ring 31 lens retaining cylinder 19 for retaining the front group of lenses containing lenses $L_1$, $L_2$, $L_3$ and $L_4$ is spirally fitted. Lens retaining cylinder 19 for the front group of lenses and aforesaid lens retaining cylinder 20 for the back group of lenses are threaded and strongly fitted into each other in a body.

Pin 21 projectingly mounted on aforesaid lens retaining cylinder 20 is slidably engaged into guide slot 22 formed on fixing ring 1 in the axial direction of the optical axis to prevent lens retaining cylinders 19 and 20 from rotating, and to move lens retaining cylinders 19 and 20 forwards and backwards along the optical axis in accordance with the rotation of focusing ring 29 so as to effect the adjustment for focusing.

Numeral 33 denotes a distance scale formed on lens retaining cylinders 19, and 32 is an index formed on focusing ring 29.

Accordingly, when operation ring 25 is rotated in the state that it is biassed by means of spring 24 and is thereby displaced forwards, as first annular strip 27 is in contact with operation surface 30 of focusing ring 29, the rotation thereof is transmitted to the focusing ring by means of the frictional surfaces formed on both or the frictional surface fromed on either of them, so that the focusing can be effected.

On the other hand, when operation ring 25 is rotated after having displaced backwards along the optical axis against spring 24, the rotation of operation ring 5 is transmitted to aperture adjusting ring 5 by the frictional surfaces formed on both of second annular strip 28 of operation ring 25 and operation surface 6 of aperture adusting ring 5, or by the frictional surface formed on either of them, so that the diaphragm value of the diaphragm blade can be adjusted through slit 14 of L-shaped actuating lever 13 and pin 15.

In the second embodiment in accordance with the present invention shown in FIG. 2, the zooming of an objective lens is operated as one of the adjustments for the objective lens, and as the other adjustment for the objective lens an adjustment for a diaphragm aperture is effected.

Identical symbols are adopted for the same members as those described in the first embodiment.

Fixing lens barrel 1a, the rear end of which is provided with fitting portion 2 for mounting on a camera, is fixed with cam cylinder 50 extending in the axial direction by screw 55, and further onto the front end thereof fixing lens barrel 1b for focusing is fixed.

Aperture adjusting ring 5 rotatably fitted into aforesaid fixing lens barrel 1a is formed with operation surface 6 with a large frictional coefficient on the front edge thereof, and annular slot 7 is also formed thereon.

Into this slot 7 aperture setting ring 8 fixed into fixing ring 1a by screw 9 is fixed, and thereon the diaphragm value set by the diaphragm scale on aperture adjusting ring 5 and the index on aperture setting ring 8 is indicated. L-shaped aperture actuating lever 12 is fixed into aperture adjusting ring 5 by screw 13 and is extended forwards through annular slot 4 on aforesaid fixing ring 1a, and on the front end thereof slot 14 is formed in parallel with the optical axis.

The structure mentioned above is similar with that in the first embodiment.

The objective lens is composed of lenses $L_1$, $L_2$, $L_3$, $L_4$, $L_5$, $L_6$, $L_7$, $L_8$ and $L_9$; the focusing component is composed of lenses $L_1$, $L_2$, $L_3$ and $L_4$, the zooming component consists of lenses $L_5$ and $L_6$, and the base component is composed of $L_7$, $L_8$ and $L_9$.

Between lenses $L_6$ and $l_7$, pin 15 is projected backwards from diaphragm device 16 having diaphragm blade 17 fixed inside fixing lens barrel 1a.

This pin 15 engages into aforesaid slot 14, the rotation of aperture adjusting ring 5 around fixing lens barrel 1a is transmitted to the aperture ring well known but not shown in the drawings through L-shaped aperture actuating lever 12 and pin 15, and thus the diaphragm aperture formed by diaphragm blade 17 is adjusted.

Actuating ring 64 for zooming which is rotatably mounted on aforesaid cam cylinder 50 and whose axial position is prescribed by the front edge of fixing ring 1a and the rear edge of fixing ring 1b, is provided with guide slot 65 in parallel with the optical axis, and on the outer surface of actuating ring 64 zooming adjusting ring 61 is fixed by screw 63. On the rear edge of this zooming adjusting ring 61 there is formed operation surface 62 with a large frictional coefficient.

Zooming component retaining frame 53 for retaining zooming lens component $L_5$ and compensating component retaining frame 54 for retaining compensating lens component $L_6$ are slidably fitted into cam cylinder 50 respectively, and pins 56 and 57 are projected outwardly from aforesaid retaining frames 53 and 54 respectively.

Cam cylinder 50 is provided with first and second cam slots 51 and 52 for zooming in their spiral shapes.

Aforesaid pin 56 extending through aforesaid first cam slot 51 engages into guide slot 65 formed on aforesaid zooming actuating ring 64, and pin 57 extending through second cam slot 52 engages into guide slot 65. Therefore, the rotation of zooming adjusting ring 61 makes the axial displacements of pins 56 and 57 along first and second cam slots 51 and 52 so that zooming lens component $L_5$ and compensating lens component $L_6$ are axially displaced so as to effect the zooming of whole lens system.

On fixing ring 1a between aperture adjusting ring 5 and zooming adjusting ring 61 operation ring 25 rotatable and axially slidable is loosely fitted, and in parallel with the optical axis thereof hole 23 is opened backwards, and inside hole 23 spring 24 is provided. Pin 18 projected forwards in parallel with the optical axis from aforesaid aperture adjusting ring 5 is fittted into hole 23, and gives an axially slidable tendency forwards along the optical axis, to operation ring 25.

The outer periphery of aforesaid operation ring 25 is provided with grip 26 for the manual operation thereof, and the inner periphery thereof is provided, at its front edge, with first annular strip 27 moved together with operation surface 62 of aforesaid zooming adjusting ring 61, and at its rear edge, with second annular strip 28 moved together with operation surface 6 of aperture adjusting ring 5. First annular strip 27 is ordinarily in contact with operation surface 62 by means of aforesaid tendency of the spring so that the rotation of operation ring 25 is transmitted to zooming adjusting ring 61. When operation ring 25 is made backward displacement against aforesaid spring tendency, second annular strip 28 comes into contact with operation surface 6, so that the rotation of operation ring 25 is transmitted to aperture adjusting ring 5.

On the outer periphery of fixing lens barrel 1b focusing ring 29 is loosely and rotatably fitted with the position thereof in the axial direction prescirbed, and helicoid ring 31 thereof is spirally fixed with lens frame 19 for retaining the focusing component of lens system consisting of lenses $L_1$, $L_2$ and $L_3$. On the rear end of focusing lens frame 19 hole 35 is formed in parallel with the optical axis, and pin 16 projecting forwards from fixing ring 1b engages into hole 35 so as to prevent focusing lens frame 19 from rotating.

Accordingly, the rotation of focusing ring 29 moves focusing lens frame 19 in the axial direction to effect focusing.

In this embodiment, the adjustment for the objective lens system is effected by focusing ring 29 and operation ring 25, and the adjustment for zooming and adjustment for diaphragm aperture can also be effected by the axial displacement of operation ring 25; three adjustments, which necessitate three respective adjusting rings in the prior art, can be effected by two adjusting rings.

The present invention is characterized in that out of various kinds of adjustments for a diaphragm, for a preset for a diaphragm, for focusing, for zooming, etc., at least two different adjustments can be effected by axially displacing one operation ring along the optical axis, thus the confusion in the selection of an operation ring is avoided, preventing the other ring from being incidentally misoperated.

As is clear from the above description, the present invention is not limited to aforesaid two embodiments, but many modifications and variations can be made within the scope of the present invention. All such variations and modifications are to be included within the scope of the present invention.

What is claimed is:

1. An adjusting device for the objective lens of a camera comprising:

an objective lens used for a camera having a number of lenses and a diaphragm device;

a fixing ring in said objective lens;

a first adjusting ring axially immovable along the optical axis relative to said fixing ring but rotatable, and effecting the adjustment for aforesaid lenses or for said diaphragm device;

a second adjusting ring spaced with aforesaid first adjusting ring, and axially immovable along the optical axis relative to said fixing ring but rotatable, and making another adjustment for said lenses or the adjustment for said diaphragm device;

an operation member rotatable as well as axially movable between said first and second adjusting rings along the optical axis relative to the fixing ring;

a first annular strip portion formed on said operation member for transmitting to said adjusting ring the rotation of said operation member when the operation member is positioned in the first position coming into contact with said first adjusting ring; and a second annular strip portion formed on said operation member for transmitting to said second adjusting ring the rotation of said operation member when the operation member is positioned in the second position coming into contact with said second adjusting ring.

2. The adjusting device for the objective lens of a camera as set forth in claim 1, wherein the first adjusting ring consists of a focusing ring for adjusting the focusing of a lens system, and the second adjusting ring consists of an aperture adjusting ring for adjusting a diaphragm aperture.

3. The adjusting device for the objective lens of a camera as set forth in claim 1, wherein the first adjusting ring consists of a zooming adjusting ring for changing the axial space between the zooming lens component and the compensating lens component of a lens system, and the second adjusting ring consists of an aperture adjusting ring for adjusting a diaphragm aperture.

4. The adjusting device for the objective lens of a camera as set forth in cliam 1, wherein at least either of the first annular strip in said operation member or the operation surface of the first adjusting ring coming into contact with said first annular strip at the first position of said operation member, and at least either of the second annular strip of said operation member or the operation surface of the second adjusting ring coming into contact with said second annular strip at the second position of said operation member, are formed into surfaces with a large frictional coefficient.

5. The adjusting device for the objective lens of a camera as set forth in claim 1 further comprising:

a spring means for biassing said operation member to one of said adjusting rings to frictionally engage one of the annular strips of said operation member with the operation surface of said adjusting ring.

* * * * *

UNITED STATES PATENT OFFICE
CERTIFICATE OF CORRECTION

Patent No. 3,772,978      Dated November 20, 1973

Inventor(s) Hiroshi Mito

It is certified that error appears in the above-identified patent and that said Letters Patent are hereby corrected as shown below:

In the title page, please insert --Claims priority on

Japan          101574/71, filed November 2, 1971--

Signed and sealed this 23rd day of April 1974.

(SEAL)
Attest:

EDWARD M. FLETCHER, JR.          C. MARSHALL DANN
Attesting Officer                Commissioner of Patents